United States Patent
Witting et al.

(10) Patent No.: US 11,429,601 B2
(45) Date of Patent: Aug. 30, 2022

(54) SYSTEM FOR GENERATING CUSTOMIZED DATA INPUT OPTIONS USING MACHINE LEARNING TECHNIQUES

(71) Applicant: BANK OF AMERICA CORPORATION, Charlotte, NC (US)

(72) Inventors: David Henry Witting, Seattle, WA (US); Devanshu Mukherjee, Frisco, TX (US); Ravisha Andar, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 135 days.

(21) Appl. No.: 17/094,342

(22) Filed: Nov. 10, 2020

(65) Prior Publication Data

US 2022/0147522 A1 May 12, 2022

(51) Int. Cl.
| | |
|---|---|
| *G06F 16/242* | (2019.01) |
| *G06N 20/00* | (2019.01) |
| *G06F 8/61* | (2018.01) |
| *H04L 9/40* | (2022.01) |
| *G06F 40/117* | (2020.01) |
| *G06F 40/274* | (2020.01) |
| *G06Q 20/32* | (2012.01) |
| *G06Q 20/10* | (2012.01) |
| *G06Q 40/02* | (2012.01) |

(52) U.S. Cl.
CPC ............ *G06F 16/2428* (2019.01); *G06F 8/61* (2013.01); *G06F 40/117* (2020.01); *G06F 40/274* (2020.01); *G06N 20/00* (2019.01); *H04L 63/08* (2013.01); *G06Q 20/1085* (2013.01); *G06Q 20/326* (2020.05); *G06Q 40/02* (2013.01)

(58) Field of Classification Search
None
See application file for complete search history.

(56) References Cited

U.S. PATENT DOCUMENTS

| | | |
|---|---|---|
| 3,327,291 A | 6/1967 | Lee |
| 5,719,692 A | 2/1998 | Cohen |
| 5,832,467 A | 11/1998 | Wavish |
| 5,963,910 A | 10/1999 | Ulwick |
| 6,018,619 A | 1/2000 | Allard et al. |
| 6,112,304 A | 8/2000 | Clawson |
| 6,507,726 B1 | 1/2003 | Atkinson et al. |

(Continued)

*Primary Examiner* — Howard Cortes
(74) *Attorney, Agent, or Firm* — Moore & Van Allen PLLC; Anup Shrinivasan Iyer

(57) ABSTRACT

Systems, computer program products, and methods are described herein for generating customized data input options using machine learning techniques. The present invention is configured to electronically receive, from a computing device of a user, an input query; retrieve, from a database associated with an entity, information associated with the user; determine a resource distribution profile of the user, wherein the resource distribution profile comprises one or more resource transfers executed by the user; generate one or more customized autocomplete options for the input query based on at least the information associated with the user and the resource distribution profile of the user; and transmit control signals configured to cause the computing device of the user to display the one or more customized autocomplete options to the user.

20 Claims, 2 Drawing Sheets

(56) References Cited

U.S. PATENT DOCUMENTS

| | | |
|---|---|---|
| 6,523,015 B1 | 2/2003 | Bera et al. |
| 6,894,972 B1 | 5/2005 | Phaal |
| 7,023,979 B1 | 4/2006 | Wu et al. |
| 10,922,374 B1* | 2/2021 | Hooshmand ........ G06F 16/9536 |
| 11,232,515 B1* | 1/2022 | White, III ............... G10L 15/22 |
| 2002/0159641 A1 | 10/2002 | Whitney et al. |
| 2002/0184408 A1 | 12/2002 | Hannigan et al. |
| 2003/0069869 A1 | 4/2003 | Gronau et al. |
| 2003/0088425 A1 | 5/2003 | Lam et al. |
| 2003/0097302 A1 | 5/2003 | Overhultz et al. |
| 2004/0059966 A1 | 3/2004 | Chan et al. |
| 2004/0078175 A1 | 4/2004 | Shaw et al. |
| 2005/0076245 A1 | 4/2005 | Graham et al. |
| 2005/0090911 A1 | 4/2005 | Ingargiola et al. |
| 2005/0132052 A1 | 6/2005 | Uttamchandani et al. |
| 2005/0228789 A1 | 10/2005 | Fawcett et al. |
| 2005/0267913 A1 | 12/2005 | Stienhans et al. |
| 2005/0278362 A1 | 12/2005 | Maren et al. |
| 2006/0218088 A1* | 9/2006 | Flora ...................... G06Q 10/10 705/39 |
| 2006/0247973 A1 | 11/2006 | Mueller et al. |
| 2011/0191364 A1* | 8/2011 | LeBeau .............. G06F 16/3338 707/E17.014 |
| 2013/0282561 A1* | 10/2013 | Runkle .............. G06Q 20/4015 705/39 |
| 2014/0195888 A1* | 7/2014 | Alford, Jr ............. G06F 40/174 715/226 |
| 2014/0272816 A1* | 9/2014 | Callahan ............ G06Q 30/0633 434/127 |
| 2016/0300204 A1* | 10/2016 | Guido ................. G06Q 20/108 |
| 2018/0181928 A1* | 6/2018 | Woo ..................... G06Q 20/223 |
| 2018/0211333 A1* | 7/2018 | Lackman ............... G06N 20/00 |
| 2018/0367484 A1* | 12/2018 | Rodriguez ............. H04L 51/02 |
| 2019/0036837 A1* | 1/2019 | Brand .................... H04L 67/10 |
| 2019/0205368 A1* | 7/2019 | Wang .................. G06F 40/174 |
| 2019/0378112 A1* | 12/2019 | Grassadonia .......... G06Q 40/00 |
| 2020/0234819 A1* | 7/2020 | Keller ................... G16H 40/67 |
| 2021/0097110 A1* | 4/2021 | Asthana ................. H04L 51/02 |
| 2021/0157618 A1* | 5/2021 | Moon .................... H04L 51/02 |
| 2021/0365632 A1* | 11/2021 | Trim ....................... G06N 3/04 |
| 2021/0377201 A1* | 12/2021 | D'Agostino ....... G06Q 30/0239 |
| 2021/0397634 A1* | 12/2021 | Gerber, Jr. ............ G06F 16/353 |

\* cited by examiner

SYSTEM FOR GENERATING CUSTOMIZED DATA INPUT OPTIONS USING MACHINE LEARNING TECHNIQUES

FIELD OF THE INVENTION

The present invention embraces a system for generating customized data input options using machine learning techniques.

BACKGROUND

Autocomplete enables users to quickly find and select from a pre-populated list of values as they type, leveraging searching and filtering. However, the efficacy of providing customized data input options is limited by using only the user's input query to provide the list of possible options. There is a need for a system to leverage relationship information of the user with an entity to generate customized data input options using machine learning techniques.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating customized data input options using machine learning techniques is presented. The system comprising: at least one non-transitory storage device; and at least one processing device coupled to the at least one non-transitory storage device, wherein the at least one processing device is configured to: electronically receive, from a computing device of a user, an input query; retrieve, from a database associated with an entity, information associated with the user; determine a resource distribution profile of the user, wherein the resource distribution profile comprises one or more resource transfers executed by the user; generate one or more customized autocomplete options for the input query based on at least the information associated with the user and the resource distribution profile of the user; and transmit control signals configured to cause the computing device of the user to display the one or more customized autocomplete options to the user.

In some embodiments, the at least one processing device is further configured to: determine one or more resource types associated with the one or more customized autocomplete options; tag the one or more customized autocomplete options with the one or more resource types corresponding to the one or more customized autocomplete options.

In some embodiments, the at least one processing device is further configured to: determine a relationship level of the user with the entity; determine one or more applicable customized autocomplete options from the one or more customized autocomplete options based on at least the relationship level of the user with the entity; and transmit control signals configured to cause the computing device of the user to display the one or more applicable customized autocomplete options to the user.

In some embodiments, the at least one processing device is further configured to: generate one or more complete input queries based on at least the input query and the one or more customized autocomplete options; determine one or more solutions to the one or more complete input queries; determine one or more unique solutions from the one or more solutions; and transmit control signals configured to cause the computing device of the user to display the one or more customized autocomplete options associated with the one or more unique solutions to the user.

In some embodiments, the at least one processing device is further configured to: initiate a vectorization engine on the one or more solutions; vectorize, using the vectorization engine, the one or more solutions into a vector of real numbers; map, using the vectorization engine, the one or more vectorized solutions in a vector space; and determine a similarity measure associated with each of the one or more solutions, wherein determining further comprises determining a distance measure between each of the one or more vectorized solutions and one or more centroids of one or more clusters formed by the one or more vectorized solutions.

In some embodiments, the at least one processing device is further configured to: compare the similarity measure associated with each of the one or more solutions with a predetermined threshold; determine that the similarity measure associated with each of the one or more solutions is greater than the predetermined threshold; and determine the one or more unique solutions based on at least determining the one or more solutions with the similarity measure that is greater than the predetermined threshold.

In some embodiments, the at least one processing device is further configured to: provide a proprietary mobile application associated with the entity for installation on the computing device of the user; and electronically receive, via the proprietary mobile application, the input query.

In some embodiments, the at least one processing device is further configured to: determine that the input query is associated with an execution of one or more resource transfers; determine one or more recipients for the user to execute the one or more resource transfers based on determining that the input query is associated with the execution of the one or more resource transfers; and transmit control signals configured to cause the computing device of the user to display the one or more recipients for the user.

In another aspect, a computer program product for generating customized data input options using machine learning techniques is presented. The computer program product comprising a non-transitory computer-readable medium comprising code causing a first apparatus to: electronically receive, from a computing device of a user, an input query; retrieve, from a database associated with an entity, information associated with the user; determine a resource distribution profile of the user, wherein the resource distribution profile comprises one or more resource transfers executed by the user; generate one or more customized autocomplete options for the input query based on at least the information associated with the user and the resource distribution profile of the user; and transmit control signals configured to cause the computing device of the user to display the one or more customized autocomplete options to the user.

In yet another aspect, a method for generating customized data input options using machine learning techniques is presented. The method comprising: electronically receiving, from a computing device of a user, an input query; retrieving, from a database associated with an entity, information associated with the user; determining a resource distribution profile of the user, wherein the resource distribution profile comprises one or more resource transfers executed by the user; generating one or more customized autocomplete options for the input query based on at least the information associated with the user and the resource distribution profile of the user; and transmitting control signals configured to cause the computing device of the user to display the one or more customized autocomplete options to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
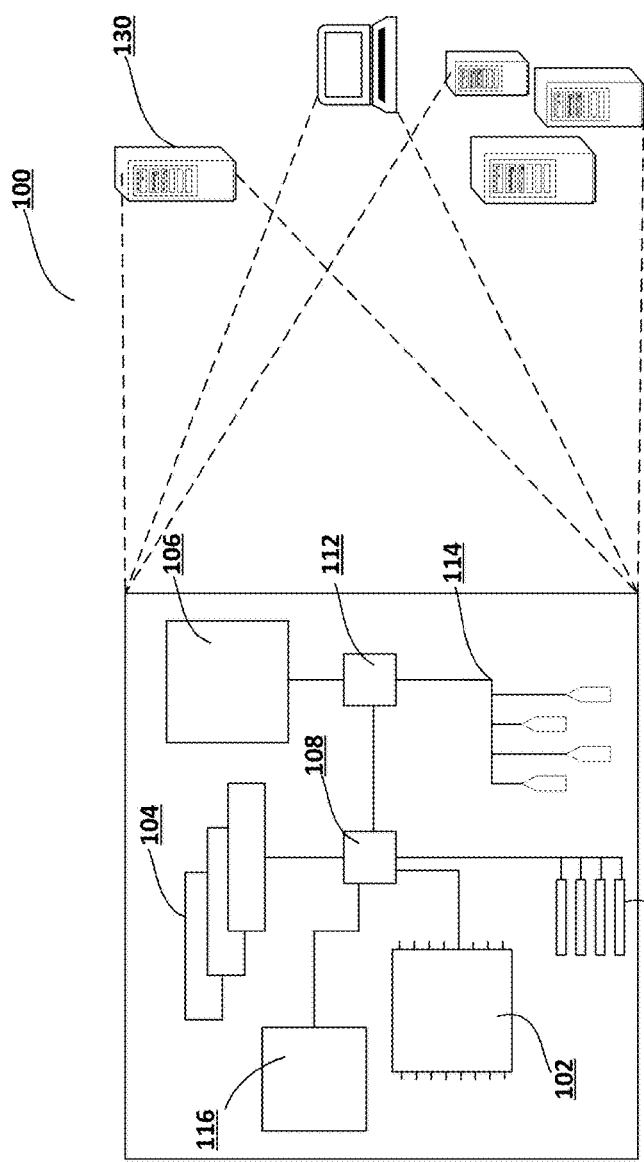
Figure 1:
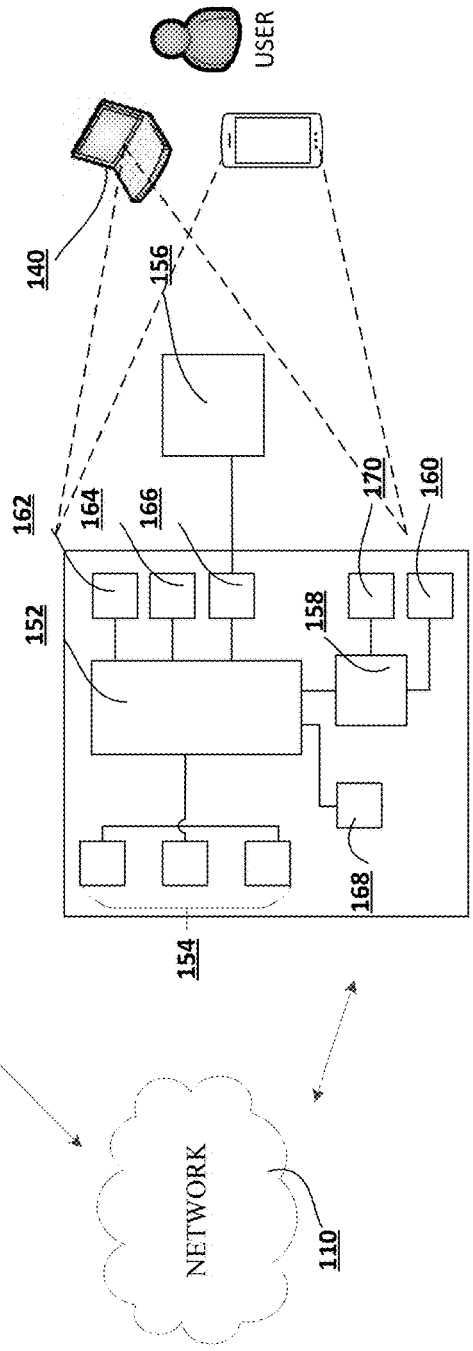
Figure 2:
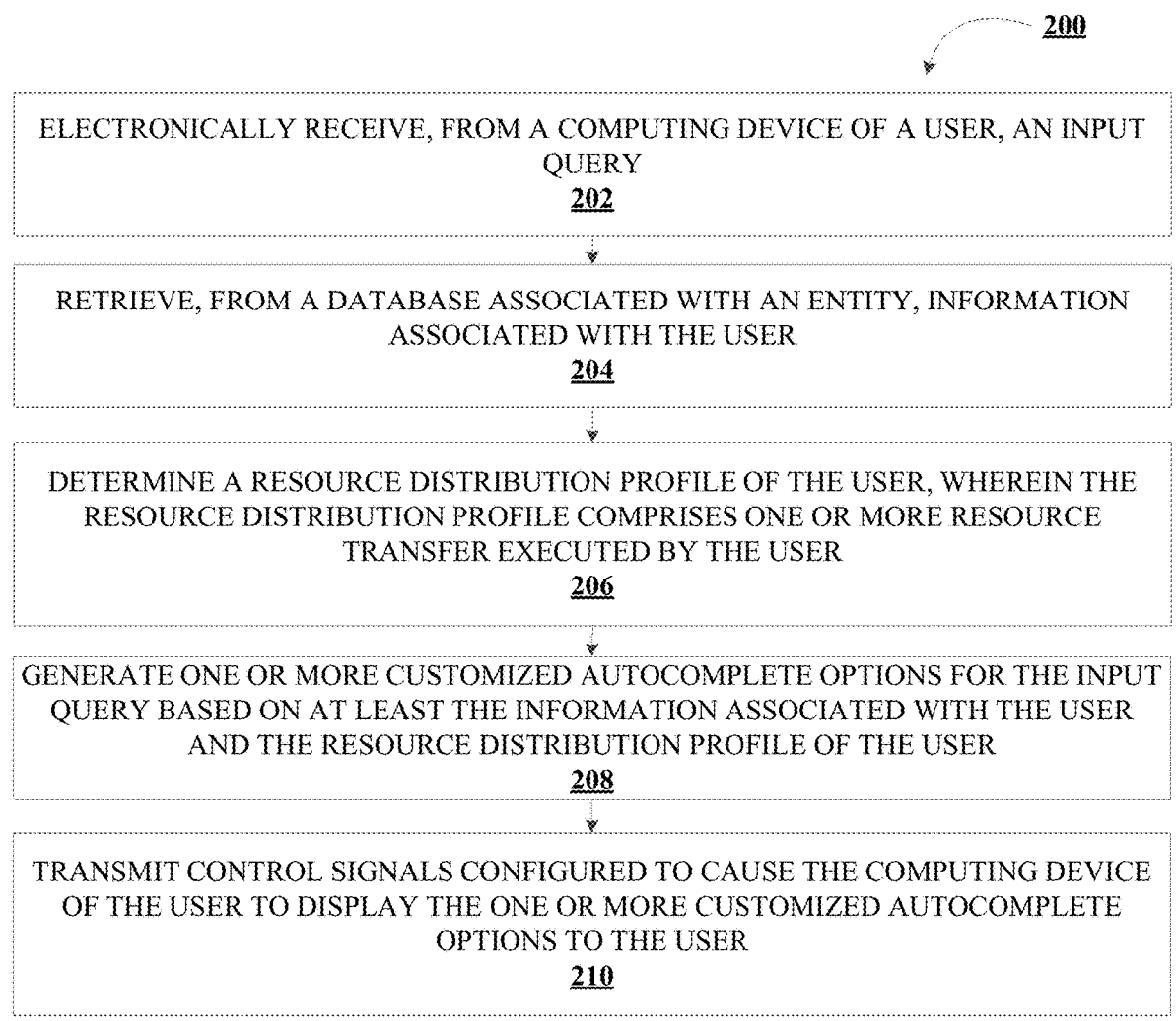

Having thus described embodiments of the invention in general terms, reference will now be made the accompanying drawings, wherein:

FIG. 1 illustrates technical components of a system for generating customized data input options using machine learning techniques, in accordance with an embodiment of the invention;

FIG. 2 illustrates a process flow for generating customized data input options using machine learning techniques, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

The present invention provides an improvement over existing systems that provide pre-populated list of autocomplete options by, (i) increasing accuracy of autocomplete options based on individual user information, (ii) increasing accuracy of autocomplete options based on existing relationship of the user with the entity, (iii) filtering similar autocomplete options at index time, and (iv) tagging autocomplete options based on their target intent such that only customized options associated with implementable solutions are presented to the user.

FIG. 1 presents an exemplary block diagram of the system environment for generating customized data input options using machine learning techniques 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for generating customized data input options using machine learning techniques 200, in accordance with an embodiment of the invention. As shown in block 202, the process flow includes electronically receiving, from a computing device of a user, an input query. In this regard, the system may be configured to provide a proprietary mobile application associated with the entity for installation on the computing device of the user. For example, the proprietary mobile application may be a financial institution application. To submit an input query, the user may be required to open the financial institution application and sign in using valid authentication credentials for identity verification. Once the user's identity is verified, the user may navigate the financial institution application to identify the section of the mobile application that is configured to accept input queries from the user. Accordingly, the system may be configured to receive the input query from the user via the section of the mobile application that is configured to accept input queries from the user.

Next, as shown in block 204, the process flow includes retrieving, from a database associated with an entity, information associated with the user. In some embodiments, the information associated with the user may include, information associated with any previous queries submitted by the user, a geographic location of the user, information identifying the user (such as user's name, address, phone number, and/or the like), information associated with the user's employment, education level, and/or the like.

Next, as shown in block 206, the process flow includes determining a resource distribution profile of the user, wherein the resource distribution profile comprises one or more resource transfers executed by the user. In some embodiments, the resource distribution profile may include a summary of all resource transfers (e.g., transactions) executed by the user, information associated with one or more products and services offered by the entity in which the user participates, resource values, an annual amount of incoming funds, an annual amount of outgoing funds, information associated with all resource events (a charge, transaction, exchange, or the like, that may cause an aggregate increase and/or decrease of resources for the user), and/or the like.

Both the information associated with the user and the resource distribution profile of the user are available to the entity based on an existing relationship of the user with the entity. In one example, the user may be a customer of the entity (e.g., financial institution) where the user has executed past transactions with the entity in some capacity. In some cases, the information associated with the user may be provided to the entity by the user in course of everyday interactions of the user with the entity. In other cases, the information associated with the user may be gathered by the entity in course of everyday interactions of with the user.

Next, as shown in block 208, the process flow includes generating one or more customized autocomplete options for the input query based on at least the information associated with the user and the resource distribution profile of the user. In some embodiments, the system may be configured to implement natural language processing algorithms and techniques to extract information from the input query. By implementing natural language processing algorithms and techniques, the system of the present invention focuses on understanding the query, instead of simply finding literal matches or representing knowledge in a way that is suitable for meaningful retrieval. To achieve this, the system of the present invention may implement semantic information retrieval techniques such as named entity recognition, sentiment analysis, text summarization, aspect mining, textual similarity, topic modelling, and/or the like. By implementing natural language processing algorithms and techniques on the input query, the system may be configured to generate more accurate customized autocomplete options for the user.

In some embodiments, the system may be configured to tag the customized autocomplete options with a specific resource type to indicate which resource type the corresponding solution is associated with. In some embodiments, the same input query may be applicable to a number of different resource types. As the user types the query, the number of resource types the input query may be applicable to may vary. For example, an input query with the word "deposit" may be associated with resource types such as "checking account, savings account, investment account, a resource transfer to a specific recipient, an issue with the deposit action, an erroneous deposit, and/or the like. As the user continues to type the input query and provide additional information, the applicable resource types may vary. Continuing with the previous example, by addition the phrase "$100 into account" will effectively remove resource types such as erroneous deposit, issue with the deposit action, and/or the like, but retain resource types such as checking account, savings account, potential recipients, and/or the like. Each resource type may be associated with a different solution for the user's input query. As each customized autocomplete option is generated, the system may be configured to tag them with the corresponding resource type, thereby presenting the user with a more accurate and efficient pathway to the right solution.

In some embodiments, the system may be configured to provide the user with customized autocomplete options that are associated with solutions that the user is eligible to receive based on a relationship level of the user with the entity. In one aspect, an entity may have a tiered relationship option where a user typically has to meet predetermined eligibility criteria associated with each tier to qualify for that particular tier and continue to meet the eligibility criteria to remain in the tier. Based on the relationship level of the user with the entity, i.e., depending on which tier the user falls in, the solutions available to the user in response to the input query may vary. Accordingly, the customized autocomplete options that reflect the available solutions will also vary based on the relationship level of the user with the entity. Therefore, the system may be configured to determine one or more applicable customized autocomplete options from the one or more customized autocomplete options based on at least the relationship level of the user with the entity. In this way, the system may be configured to remove customized autocomplete options that reflect solutions that the user may not be qualified for and retain those that the user does qualify for.

In some embodiments, the system may be configured to remove any customized autocomplete option that may be associated with a duplicate solution—a solution that is already associated with an existing customized autocomplete option provided to the user. In this regard, the system may be configured to generate one or more complete input queries based on at least the input query and the one or more customized autocomplete options. In response, the system may be configured to determine one or more solutions to the one or more complete input queries. In response, the system may be configured to determine one or more unique solutions from the one or more solutions. In this regard, the system may be configured to initiate a vectorization engine on the one or more solutions. In response, the system may be configured to vectorize, using the vectorization engine, the one or more solutions into a vector of real numbers. In response to vectorizing the one or more solutions, the system may be configured to map, using the vectorization engine, the one or more vectorized solutions in a vector space. Once mapped, the system may be configured to determine a similarity measure associated with each of the one or more solutions. In one aspect, the similarity measure may be a distance between each of the one or more vectorized solutions and one or more centroids of one or more clusters formed by the one or more vectorized solutions.

In response to determining the similarity measure, the system may be configured to compare the similarity measure associated with each of the one or more solutions with a predetermined threshold. The predetermined threshold may be used to determine how similar or close a particular solution is to another solution (or a set of solutions). In response to comparing, the system may be configured to determine that the similarity measure associated with each of the one or more solutions is greater than the predetermined threshold. Here, the shorter the distance, the more similar the solutions are. If the similarity measure is greater than the predetermined threshold, it is an indication that the solutions are unique enough for independent consideration.

In response, the system may be configured to determine the one or more unique solutions based on at least determining the one or more solutions with the similarity measure that is greater than the predetermined threshold. On the other hand, if the similarity measure is lower than the predetermined threshold, it is an indication that the solutions are not unique enough for independent consideration. In response, the system may be configured to remove duplicate solutions and retain only the unique solutions.

Next, as shown in block 210, the process flow includes transmitting control signals configured to cause the computing device of the user to display the one or more customized autocomplete options to the user. In response, the system may be configured to electronically receive, from the computing device of the user, a user input selecting at least one of the one or more customized autocomplete options. In response to receiving the user input, the system may be configured to retrieve the solution corresponding to the customized autocomplete option selected by the user.

In some embodiments, the system may be configured to store the solutions corresponding to the customized autocomplete options in a volatile or cache memory for efficient retrieval. In this regard, the system may be configured to retrieve the one or more solutions associated with the one or more customized autocomplete options from one or more databases associated with the entity as the input query is received. These solutions are then stored by the system in one or more volatile or cache memories until the corresponding customized autocomplete option is either selected by the user or the customized autocomplete option is no longer presented as an option. If a customized autocomplete option is selected by the user, the system may be configured to retrieve the corresponding solution from the volatile or cache memory and display the solution to the user. On the other hand, if the customized autocomplete option is no longer presented as an option (because the solution was duplicative, rendered irrelevant as the user provides more information in the input query, the user not being qualified/eligible to receive the corresponding solution, and/or the like), the corresponding solution is deleted from the volatile or cache memory and replaced with a more relevant solution.

In some embodiments, the system may be configured to determine, from analysis of the input query, that the user wishes to execute a resource transfer. In response, the system may be configured to include one or more resource transfer recipients as part of the customized autocomplete options. In some embodiments, the one or more recipients for the user may be retrieved from the resource distribution profile of the user and/or one or more prior resource transfers executed by the user. In response, the system may be configured to transmit control signals configured to cause the computing device of the user to display the one or more recipients for the user.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for generating customized data input options using machine learning techniques, the system comprising:
   at least one non-transitory storage device; and
   at least one processing device coupled to the at least one non-transitory storage device, wherein the at least one processing device is configured to:
   electronically receive, from a computing device of a user, an input query;
   retrieve, from a database associated with an entity, information associated with the user;
   determine a resource distribution profile of the user, wherein the resource distribution profile comprises one or more resource transfers executed by the user;

generate one or more customized autocomplete options for the input query based on at least the information associated with the user and the resource distribution profile of the user;
generate one or more complete input queries based on at least the input query and the one or more customized autocomplete options;
determine one or more solutions to the one or more complete input queries;
vectorize, using a vectorization engine, the one or more solutions into a vector of real numbers;
map, using the vectorization engine, the one or more vectorized solutions in a vector space;
determine a similarity measure associated with each of the one or more solutions using the one or more vectorized solutions;
determine one or more unique solutions based on at least the similarity measure; and
transmit control signals configured to cause the computing device of the user to display the one or more customized autocomplete options to the user.

2. The system of claim 1, wherein the at least one processing device is further configured to:
determine one or more resource types associated with the one or more customized autocomplete options;
tag the one or more customized autocomplete options with the one or more resource types corresponding to the one or more customized autocomplete options.

3. The system of claim 2, wherein the at least one processing device is further configured to:
determine a relationship level of the user with the entity;
determine one or more applicable customized autocomplete options from the one or more customized autocomplete options based on at least the relationship level of the user with the entity; and
transmit control signals configured to cause the computing device of the user to display the one or more applicable customized autocomplete options to the user.

4. The system of claim 1, wherein the at least one processing device is further configured to:
determine the one or more unique solutions from the one or more solutions; and
transmit control signals configured to cause the computing device of the user to display the one or more customized autocomplete options associated with the one or more unique solutions to the user.

5. The system of claim 4, wherein the at least one processing device is further configured to:
determine the similarity measure associated with each of the one or more solutions, wherein determining further comprises determining a distance measure between each of the one or more vectorized solutions and one or more centroids of one or more clusters formed by the one or more vectorized solutions.

6. The system of claim 5, wherein the at least one processing device is further configured to:
compare the similarity measure associated with each of the one or more solutions with a predetermined threshold;
determine that the similarity measure associated with each of the one or more solutions is greater than the predetermined threshold; and
determine the one or more unique solutions based on at least determining the one or more solutions with the similarity measure that is greater than the predetermined threshold.

7. The system of claim 1, wherein the at least one processing device is further configured to:
provide a proprietary mobile application associated with the entity for installation on the computing device of the user; and
electronically receive, via the proprietary mobile application, the input query.

8. The system of claim 1, wherein the at least one processing device is further configured to:
determine that the input query is associated with an execution of one or more resource transfers;
determine one or more recipients for the user to execute the one or more resource transfers based on determining that the input query is associated with the execution of the one or more resource transfers; and
transmit control signals configured to cause the computing device of the user to display the one or more recipients for the user.

9. A computer program product for generating customized data input options using machine learning techniques, the computer program product comprising a non-transitory computer-readable medium comprising code causing a first apparatus to:
electronically receive, from a computing device of a user, an input query;
retrieve, from a database associated with an entity, information associated with the user;
determine a resource distribution profile of the user, wherein the resource distribution profile comprises one or more resource transfers executed by the user;
generate one or more customized autocomplete options for the input query based on at least the information associated with the user and the resource distribution profile of the user;
generate one or more complete input queries based on at least the input query and the one or more customized autocomplete options;
determine one or more solutions to the one or more complete input queries;
vectorize, using a vectorization engine, the one or more solutions into a vector of real numbers;
map, using the vectorization engine, the one or more vectorized solutions in a vector space;
determine a similarity measure associated with each of the one or more solutions using the one or more vectorized solutions;
determine one or more unique solutions based on at least the similarity measure; and
transmit control signals configured to cause the computing device of the user to display the one or more customized autocomplete options to the user.

10. The computer program product of claim 9, wherein the first apparatus is further configured to:
determine one or more resource types associated with the one or more customized autocomplete options;
tag the one or more customized autocomplete options with the one or more resource types corresponding to the one or more customized autocomplete options.

11. The computer program product of claim 10, wherein the first apparatus is further configured to:
determine a relationship level of the user with the entity;
determine one or more applicable customized autocomplete options from the one or more customized autocomplete options based on at least the relationship level of the user with the entity; and transmit control signals configured to cause the computing device of the user to display the one or more applicable customized autocomplete options to the user.

12. The computer program product of claim 9, wherein the first apparatus is further configured to:
   determine the one or more unique solutions from the one or more solutions; and
   transmit control signals configured to cause the computing device of the user to display the one or more customized autocomplete options associated with the one or more unique solutions to the user.

13. The computer program product of claim 12, wherein the first apparatus is further configured to:
   determine the similarity measure associated with each of the one or more solutions, wherein determining further comprises determining a distance measure between each of the one or more vectorized solutions and one or more centroids of one or more clusters formed by the one or more vectorized solutions.

14. The computer program product of claim 13, wherein the first apparatus is further configured to:
   compare the similarity measure associated with each of the one or more solutions with a predetermined threshold;
   determine that the similarity measure associated with each of the one or more solutions is greater than the predetermined threshold; and
   determine the one or more unique solutions based on at least determining the one or more solutions with the similarity measure that is greater than the predetermined threshold.

15. The computer program product of claim 9, wherein the first apparatus is further configured to:
   provide a proprietary mobile application associated with the entity for installation on the computing device of the user; and
   electronically receive, via the proprietary mobile application, the input query.

16. The computer program product of claim 9, wherein the first apparatus is further configured to:
   determine that the input query is associated with an execution of one or more resource transfers;
   determine one or more recipients for the user to execute the one or more resource transfers based on determining that the input query is associated with the execution of the one or more resource transfers; and
   transmit control signals configured to cause the computing device of the user to display the one or more recipients for the user.

17. A method for generating customized data input options using machine learning techniques, the method comprising:
   electronically receiving, from a computing device of a user, an input query;
   retrieving, from a database associated with an entity, information associated with the user;
   determining a resource distribution profile of the user, wherein the resource distribution profile comprises one or more resource transfers executed by the user;
   generating one or more customized autocomplete options for the input query based on at least the information associated with the user and the resource distribution profile of the user;
   generating one or more complete input queries based on at least the input query and the one or more customized autocomplete options;
   determining one or more solutions to the one or more complete input queries;
   vectorizing, using a vectorization engine, the one or more solutions into a vector of real numbers;
   mapping, using the vectorization engine, the one or more vectorized solutions in a vector space;
   determining a similarity measure associated with each of the one or more solutions using the one or more vectorized solutions;
   determining one or more unique solutions based on at least the similarity measure; and
   transmitting control signals configured to cause the computing device of the user to display the one or more customized autocomplete options to the user.

18. The method of claim 17, wherein the method further comprises:
   determining one or more resource types associated with the one or more customized autocomplete options;
   tagging the one or more customized autocomplete options with the one or more resource types corresponding to the one or more customized autocomplete options.

19. The method of claim 18, wherein the method further comprises:
   determining a relationship level of the user with the entity;
   determining one or more applicable customized autocomplete options from the one or more customized autocomplete options based on at least the relationship level of the user with the entity; and
   transmitting control signals configured to cause the computing device of the user to display the one or more applicable customized autocomplete options to the user.

20. The method of claim 17, wherein the method further comprises:
   generating one or more complete input queries based on at least the input query and the one or more customized autocomplete options;
   determining one or more solutions to the one or more complete input queries;
   determining one or more unique solutions from the one or more solutions; and
   transmitting control signals configured to cause the computing device of the user to display the one or more customized autocomplete options associated with the one or more unique solutions to the user.

* * * * *